United States Patent [19]

Bargeton et al.

[11] 4,365,248

[45] Dec. 21, 1982

[54] DIGITAL TRANSMISSION LINK RELIEF TRIGGERING SYSTEM

[75] Inventors: Gilbert L. Bargeton, Paris; Claude P. Beynie, La Varenne, both of France

[73] Assignee: Societe Anonyme de Telecommunications, Paris, France

[21] Appl. No.: 223,092

[22] Filed: Jan. 7, 1981

[30] Foreign Application Priority Data

Jan. 11, 1980 [FR] France ............................ 80 00622

[51] Int. Cl.³ .................... H04B 3/46; H04Q 9/00; G06F 11/00
[52] U.S. Cl. .................... 340/825.01; 179/175.3 S; 370/16; 371/8
[58] Field of Search .................. 370/16; 340/147 SC, 340/147 R, 825.01; 179/175.3 R, 175.3 S; 371/8; 324/51; 178/69 G

[56] References Cited

U.S. PATENT DOCUMENTS

| | | | |
|---|---|---|---|
| 3,864,533 | 2/1975 | Erlund | 179/175.3 S |
| 4,009,469 | 2/1977 | Boudreau et al. | 370/16 |
| 4,068,105 | 1/1978 | Jain et al. | 371/8 |
| 4,159,470 | 6/1979 | Strojny et al. | 340/147 SC |
| 4,264,893 | 4/1981 | Hutch | 340/147 R |

FOREIGN PATENT DOCUMENTS

1558903 1/1980 United Kingdom .

OTHER PUBLICATIONS

"Sécurization et Supervision d'un Réseau Numérigue Urbain", Chomette et al., L'Echo des Recherches, Jan. 1979, pp. 12–19.

Primary Examiner—Thomas A. Robinson
Attorney, Agent, or Firm—Lowe, King, Price & Becker

[57] ABSTRACT

The system triggers the relief of a working line amongst N working lines in a bidirectional digital transmission link having at least one spare line. The link is interconnected between two end stations (A, B) which allow a switch-over between a faulty working line and a spare line. The relief of a working line is triggered in response to the detection of an alarm indication signal (AIS) delivered by any end or intermediary terminal included in the working line. An AIS coming from outside the link and related to the working line is detected in an end station and replaced by a switching inhibiting signal that is transmitted via the working line, or perhaps via a spare line, should the working line be faulty and previously relieved, and that is detected in the other station and then replaced by an AIS transmitted outside the link in relation to the other station.

12 Claims, 3 Drawing Figures

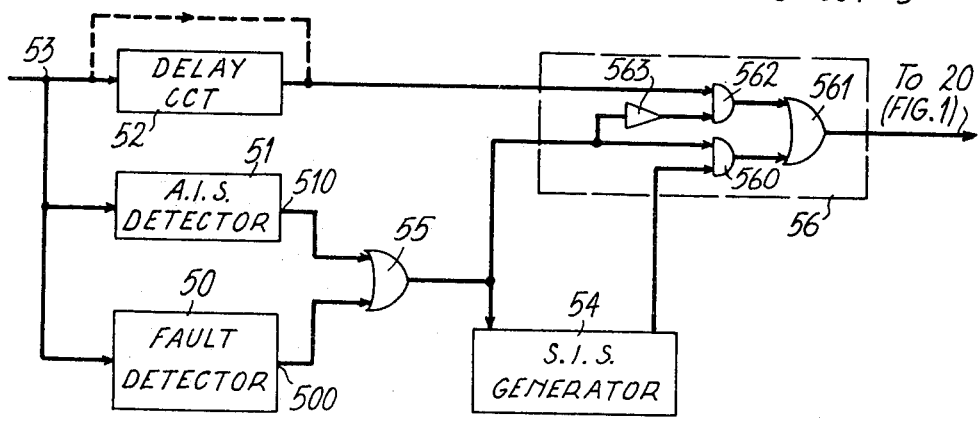
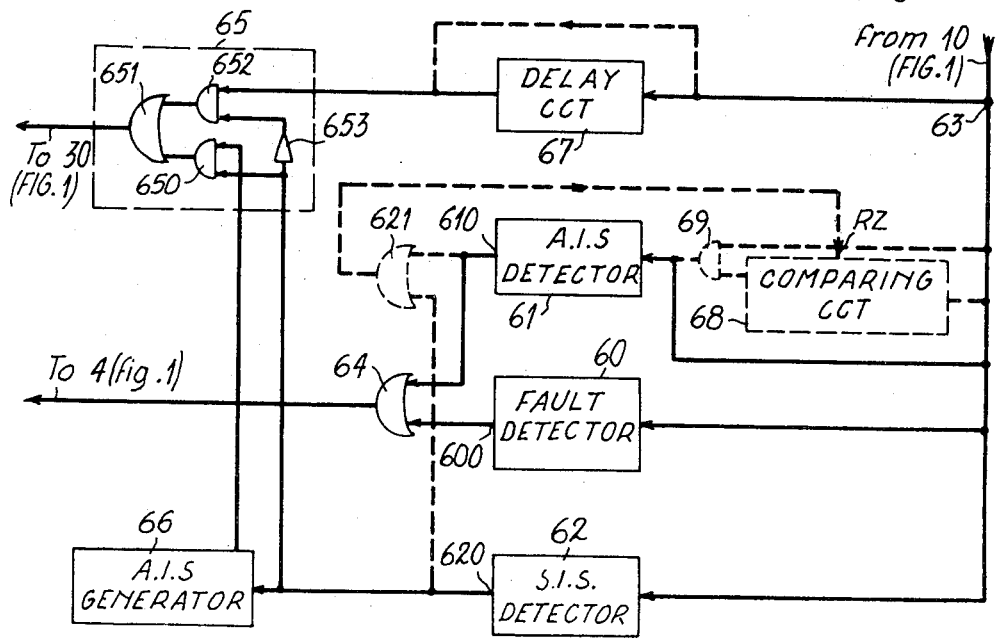

DIGITAL TRANSMISSION LINK RELIEF TRIGGERING SYSTEM

CROSS REFERENCES TO RELATED APPLICATIONS

Applicants hereby make cross reference to their French Patent Application No. PV 80 00622, filed Jan. 11, 1980 and claim priority thereunder following the provisions of 35 U.S.C. 119.

BACKGROUND OF THE INVENTION

1. Field of the Invention

The present invention relates to a system for triggering the relief of a working line in a bidirectional digital transmission link which comprises a plurality of bidirectional digital working lines and at least one bidirectional digital spare line and which is interconnected between two end stations of a digital transmission system. Each end station includes a switching unit which is intended for bidirectionally switching a working line over to a spare line when a transmission fault in the working line is selected by the switching monitor of the end station.

2. Description of the Prior Art

It will be seen, right from the outset, that the invention deals, more specifically, with a procedure which triggers the relief of a faulty working line, further details of which may be found by referring to the article by A. CHOMETTE, J. GUIOMAR and M. ROBINET, entitled "Sécurisation et Supervision d'un réseau numérique urbain" (relieving and monitoring an urban digital network), published in the French review "L'Echo des Recherches", January 1979, pages 12 to 19, or to our other U.S. Patent Application filed as of today.

A working line in a transmission link is generally composed of bidirectional line sections which are connected by line terminals at the common ends of the line. The functions of each line terminal are ascribed to the operation and maintenance of two adjacent line sections such as the power remote-supplying and remote-locating of repeaters in the line sections. Each line terminal also monitors the transmission qualities of the line sections. With this in mind, two transmission fault detectors are incorporated in each terminal for detecting the transmission faults in relation to the digital signals travelling along the two transmission directions of the working line. A certain number of the more common transmission faults can be listed as follows: loss of clock, error rate more than a predetermined error rate, as determined by checking the line code of the received digital signal, loss of frame alignment (this is relevant to digital channels time-division multiplexed into the line and containing digital voice-mode or packet-mode signals or signalling signals), loss of the received digital signal following a break in the line section or an equipment breakdown such as a power supply failure. This equipment can be a repeater or a multiplexer-demultiplexer, which is used when certain working lines outputting of an end section are multiplexed into another working line having a higher flow rate.

Upon detection of a transmission fault for a given transmission direction, the terminal sends an alarm indication signal (AIS) out to the remote end station along the given direction. The digital data signal usually conveyed by the working line downstream of the terminal is replaced in all the multiplexed channels by the AIS which is continually emitted until the transmission fault has been removed. The alarm indication signal advises the remote switching exchange beyond the nearest end station that the working line in question is out of order.

If the line terminal which has detected a fault is a so-called end terminal, i.e. a terminal in the immediate vicinity of an end station then it delivers an alarm signal to the switching monitor of the end station via an auxiliary connection in order to trigger the switch-over from the faulty working line to a selected free spare line. This switch-over operation is performed in a known manner by exchanging digital order signals between the two end stations along the free spare line, then by making use of the switching units for passing over from the faulty working line to the previously free spare line so as to avoid virtually any break in the telephone or data transmission communications that are in progress.

Only the end terminals can trigger the switch-over procedure. In other words, the transmission faults detected solely on the line sections between the end stations and the end terminals of the link cause the switch-over. On the other hand, a transmission fault arising in a line section between two intermediary terminals, i.e. not end terminals, does not enable a working line to be relieved, thereby causing the communications in progress to be cut-off.

The transmission of an AIS via the working line of the correctly link functioning may also be taken into consideration when the section of the working line outside the link transmits an AIS in all multiplexed channels of the working line. This comes about when an equipment item outside the link, such as a channel multiplexing unit, detects a transmission fault. In this case, the working line is not switched over to the spare line since, in the link itself, this working line is operating correctly.

U.K. Pat. No. 1,558,903 discloses relieving of a digital transmission link between two end stations. The link comprises in fact only two bidirectional digital transmission lines, one playing the role of a working line and the other a spare line; the lines play these roles alternately depending on whether one or the other is faulty. Each end station includes multiplexing and demultiplexing equipment acting as a switching unit for each of the two lines, an inside alarm indication signal detector which detects an alarm indication signal conveyed by the line inside the link and an outside alarm indication signal detector for the two lines as a whole.

According to this U.K. Patent, the relief procedure for a working line transmitting the digital data signal is as follows. When there is no transmission fault in the working line, i.e. the line is functioning properly, the emitting ends in the end stations make it possible to transfer the incoming signal onto the working line and the spare line of the link simultaneously. On the other hand, the receiving ends in the end stations connect only the working line to the line section outside the link. If a fault on the working line is detected, the switch over from the working line to the spare line takes place in the receiving ends so that only the spare line retransmits the digital data signal. The same is so when the working line transmits an AIS and the spare line does not or is faulty. However, when two AIS are simultaneously transmitted by the two lines, no switching occurs.

If the two AIS arise as a result of the transmission of an outside AIS and if the working line is not faulty, there is no reason to trigger off a switch-over of the two lines. However, should the working line fail, an intermediary terminal thereof which detects a transmission fault transmits an inside AIS which is merged with the outside AIS in the end stations and these stations will not cause the switch-over. Consequently, a fault existing in the working line whilst an outside AIS is being transmitted is not indicated in the end stations, i.e. does not cause a switch-over.

OBJECTS OF THE INVENTION

The principal object of this invention is to provide a system for triggering the relief of a working line in a bidirectional digital transmission link wherein the switch-over from a working line to a spare line occurs especially when the working line is faulty and receives an alarm indication signal coming from outside the link.

A further object of this invention is to relieve a working line when the transmission fault is detected both by an intermediary terminal and an end terminal of this working line.

Yet another object of this invention is to provide two systems that do not have to rely on auxiliary connections and structural modifications in the existing terminals for controlling the switch-over of a working line.

A further object of this invention is to provide a link which is fully transparent to an outside AIS, even if a working line momentarily fails, following for example a line break. The fault is signalled both at the end stations and at the remote exchanges.

SUMMARY OF THE INVENTION

According to the objects of the present invention, an improved end station is provided in a system for triggering the relief of a working line in a bidirectional digital transmission link having a plurality of bidirectional digital transmission working lines and a plurality of bidirectional digital transmission spare lines. The link is interconnected between two end stations of a digital transmission system. Each of said end stations for each of said working lines comprises:

first means for detecting a first digital alarm indication signal coming from the outside said link, first means controlled by said first detecting means for replacing the first detected outside alarm indication signal by a first digital switching inhibition signal which is transmitted through said end station on said working line or on a spare line when said working line has failed and has been relieved, second means for detecting a second digital alarm indication signal delivered from an end terminal or any intermediate terminal on said working line in order to trigger the switch-over from said working line to a spare line in said end station, third means for detecting a second switching inhibition signal delivered from said first replacing means of the other remote end station on said working line, and fourth means controlled by said third detecting means for replacing said second switching inhibition signal by a second alarm indication signal which is transmitted outside said link.

In the system embodying the invention, the criterion for switching from a faulty working line to a free spare line rests on whether or not an alarm indication signal delivered by an end or intermediate terminal of the working line is detected. More particularly, any detected transmission fault originating from an intermediate equipment item, such as a multiplexer-demultiplexer, a Hertzian relay or similar, triggers the switch-over of the working line. This switch-over depends in a known manner upon the priority of the working line in question with respect to any others which may be faulty and on there being a free spare line when the fault is detected.

Moreover, the end terminals of each of the working lines need no longer be in the immediate vicinity of the end stations and are no longer connected, via auxiliary wiring, to the switching monitors of the end station. If a fault occurs between an end terminal and an end station, transmission fault detection means are provided in the end station which also controls the triggering of the switch-over from the working line to a spare line.

In view of the fact that any alarm indication signal provided by the working line between the two end stations is interpreted as being a switching order, the present invention has provisions for inhibiting in each station any alarm indication signal supplied to the link from outside so as to obviate the detection thereof in the other end station after having been transmitted along the working line, as in the prior art. Indeed, such any detection would trigger an undesirable switching of a working line apparently functioning as it should. However, for the other station to retransmit the alarm indication signal coming from outside, the first station must replace the preceding alarm indication signal (AIS) by a so-called switching inhibition signal (SIS) detection of SIS in the other station allows the outside alarm indication signal to be restored. As regards the outside, the transmission link is thus transparent to any alarm indication signal.

BRIEF DESCRIPTION OF THE DRAWING

Other objects, features, advantages of the invention will be apparent from the following more particular description of the preferred embodiments of the invention as illustrated in the accompanying drawings, wherein:

FIG. 2 is a detailed block diagram of an alarm indicating and switching inhibiting circuit in the system embodying the invention which is in relation to a working line and which is inserted on the outer side upstream of the emitting end of the switching unit of an end station; and FIG. 3 is a detailed block diagram of an alarm generating and detecting circuit in the system embodying the invention which is in relation to a working line and which is inserted on the link side upstream of the receiving end of the switching unit of an end station.

DESCRIPTION OF THE PREFERRED EMBODIMENTS

Figure 1:
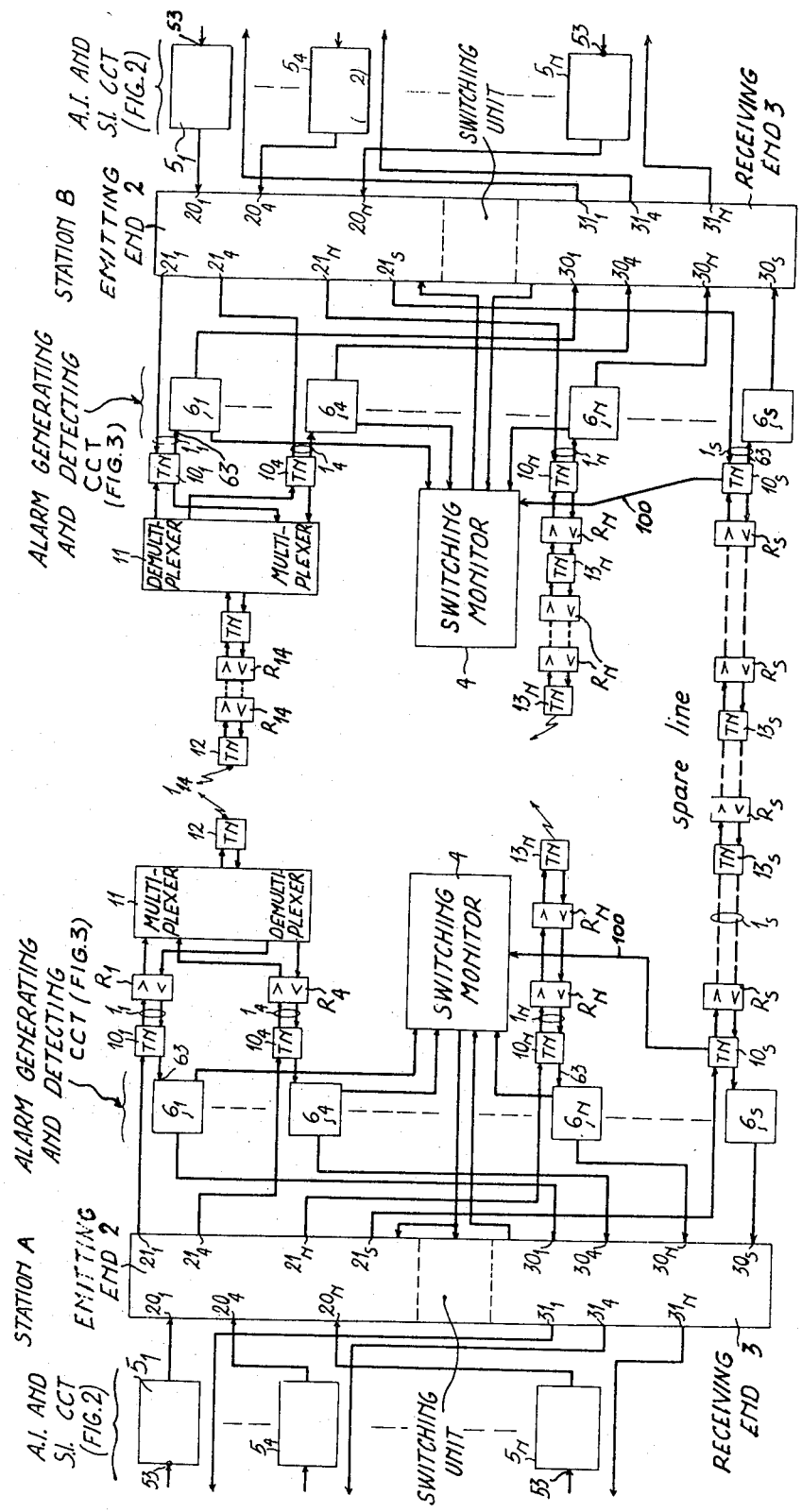
FIG. 1 is a schematic block diagram of a bidirectional digital transmission link between two end stations showing the relative lay-out of the main circuits in a system embodying the invention.

Reference is made hereinafter to a PCM digital transmission link which is made up of N bidirectional working lines $1_1$ to $1_N$ and P bidirectional spare lines $1_S$ having a 2048 kbit/s flow rate. For example, N is equal to 19 and P is equal to unity. As shown in FIG. 1, the link connects two distant end stations A and B of a PCM digital transmission system. Certain 2048 kbit/s working lines can be multiplexed into a time-division multiplex line having a higher bit rate.

According to a preferred embodiment illustrated in FIG. 1, working lines such as $1_1$ to $1_4$ are multiplexed into a 8848 k bit/s bidirectional digital line $1_{14}$ from each end station A, B and a working line such as $1_N$ directly connects the two end stations A and B. Downstream of each station, on the link side, each working line comprises a so-called end terminal $10_1$ to $10_N$. With regard to the line section conected to the succeeding terminal on the line side, each end terminal assumes the well-known functions, notably of transmission fault detection in the receive direction and alarm generation. In FIG. 1, the end terminals $10_1$ to $10_4$ of working lines $1_1$ to $1_4$ are connected via one or several line sections including repeaters $R_1$ to $R_4$ and perhaps to other so-called intermediate terminals, to a multiplexer-demultiplexer 11 which multiplexes the lines $1_1$ to $1_4$ into the 8848 kbit/s bidirectional digital line $1_{14}$. Multiplexer-demultiplexer 11 is itself connected to another intermediate terminal 12 in a communication medium such as a Hetzian communication link as shown in FIG. 1, at the other end of which is another intermediate terminal 12 on the other end station side.

Each of the working lines, such as $1_N$, and the spare lines $1_S$, can be composed of several line sections having repeaters $R_N$, $R_S$. These line sections are each interconnected between two intermediate terminals such as $13_N$, $13_S$. Generally speaking, the line sections between two adjacent terminals for the same line can consist of a coaxial cable, an optical fibre cable, balanced pair cable or Herzian channel.

On the outside of the transmission link, i.e. to the left of station A and to the right of station B in FIG. 1, each working line $1_1$ to $1_N$ may be connected to a multiplexer-demultiplexer, or quite simply to a 2048 kbit/s bidirectional digital outside line terminal. Each end station A, B also comprises power remote-supplying circuits, remote-locating circuits, gain amplifying and regulating circuits and other similar circuits, a switching unit 2-3 and a switching monitor 4. As well known, the principal function of the switching monitor 4 in an end station is to control switching in the switching unit 2-3 between a faulty working line $1_1$ to $1_N$ and a preselected free spare line $1_S$ after an exchange of order signals with the switching unit of the other distant station, via said spare line, in response to the detection of a transmission fault on the faulty transmission line. For example, when a working line such as $1_3$ has failed and a spare line such as $1_S$ is free, the monitor 4 controls a switching operation in such a way that the data signals normally conveyed upon line $1_3$ are now transmitted along spare line $1_S$ between stations A and B. In this respect, the switching unit of each end station comprises a emitting end 2 which makes it possible selectively to connect the receive input of a working line on the outer side $20_1$ to $20_N$ to the emit output $21_1$ to $21_N$ of this working line and of spare lines $21_S$ on the link side of end terminals $10_1$ to $10_N$ and $10_S$ on the link. The receiving end 3 of a switching unit allows switching in the other transmission direction, namely the selective connections of receive inputs $30_1$ to $30_N$ of a working line and $30_S$ of spare lines on the side of end terminals $10_1$ to $10_N$, $10_S$ on the link to emit output $31_1$ to $31_N$, of this working line on the outer side. The set-up and operating mode of a switching unit 2-3 and a switching monitor 4 comply with the description in the afore-mentioned article by A. CHOMETTE et al. or preferably with the specification appearing in our U.S. Patent Application filed as of today.

Generally speaking, in accordance with prior art, when a terminal such as 10, 12, 13 detects a transmission fault, on the line section preceding it along a given transmission direction, it emits an Alarm Indication Signal (AIS) on the line section following it along the given transmission direction. The equivalent binary content of the alarm indication signal is a continuous stream of "1" bits in compliance with the recommendations made by the International Telegraph and Telephone Consultative Committee. The AIS fills all the time-division multiplexed digital channels in the line running from the terminal output and informs the downstream remote switching exchange that the terminal is no longer available. Prompt maintenance action is then undertaken on the faulty line section. A further reason for the AIS being emitted is to preclude the detection of transmission faults in the line equipment positioned downstream of the faulty section, apart from the transmission fault related to a loss of frame alignment since the AIS also fills the time interval assigned to the frame alignment word.

Still according to the prior art, only the end terminals, such as $10_1$ to $10_N$, transmit via auxiliary wiring, a switch-over triggering signal to the associated station monitor 4. The switch-over triggering signal is transmitted simultaneously with the AIS emission, with a view to relieving the faulty working line $1_1$ to $1_N$ by switching over to a free spare line $1_S$. On the other hand, in an intermediate terminal such as 12, 13, the emission of the AIS generates no switch-over triggering signal. It follows that transmission faults detected in line sections not connected to end terminals $10_1$ to $10_N$ do not produce any switch-over from the faulty line. For instance, when a fault is detected in the line section between intermediate terminals 12 of the multiplex line $1_{14}$ or between two intermediate terminals $13_N$ of the line $1_N$, one of lines $1_1$ to $1_4$ or $1_N$ is relieved, thereby causing a break in the normally transmitted data. As already pointed out, this drawback is overcome in U.K. Pat. No. 1,558,903.

In accordance with the invention, it can be seen on FIG. 1 that end terminals $10_1$ to $10_N$ of working lines $1_1$ to $1_N$ no longer transmit a switch-over triggering signal to monitor 4 in the corresponding station. Only the end terminals $10_S$ of spare lines $1_S$ deliver an alarm signal via auxiliary wiring 100 in response to transmission faults on the spare lines. Indeed, the method according to the invention cannot be applied to a spare line since the spare line cannot be replaced by another line, should the spare line itself fail. As a result, the emission of an AIS by an end terminal $10_S$ on a spare line $1_S$ produces the same effects as those of the prior art.

In accordance with the invention, the switching criteria in a monitor 4 are based on the detection of an AIS in the end station. With this in mind, each end station comprises, for each working line $1_1$ to $1_N$, an alarm indicating and switching inhibiting circuit $5_1$ to $5_N$ and an alarm generating and detecting circuit $6_1$ to $6_N$. The principal function of a circuit 5 is to inhibit any effect caused by an incoming AIS which, if it were transmitted along the link, would be interpreted by the other station as a line switching and relief order. This is the reason why the alarm indicating and switching inhibiting circuits 5 are interconnected upstream of corresponding receive input 20 of the emitting end 2 of the switching unit. A circuit 6 can supply a switch-over triggering signal similar to the line end terminals of the prior art so as to order the relief from the faulty line under the control of the switching monitor 4. In order to provide for the relief operation on the working line in response to the detection of a transmission fault and to avoid any emission of a switch-over signal from a failed spare line, the corresponding alarm generating and detecting circuit 6 is interconnected between the corresponding line end terminal 10 and the corresponding receive input 30 of the switching unit receiving end 3.

FIG. 2 is a detailed block diagram of alarm indicating and switching inhibiting circuit 5. In this circuit, the inputs of a transmission fault detector 50, an alarm indication signal detector 51 and a delay circuit 52 are connected to outer side input junction 53 of the corresponding working line 1 (to the left for station A and to the right for station B in FIG. 1). Detector 50 detects the transmission faults in the outer line section between the adjacent outer end terminal (not shown) upstream of input junction 53 and the emitting end 2. The fault detector 50 is not absolutely necessary when the outer end terminal is in the immediate vicinity of the end station. The detector 51 detects the alarm indication signals that are emitted from the outer terminals upstream of input junction 53 as a result of detection of transmission faults by at least one of detector 50 of a remote station. Consequently, the detection of a transmission fault in detector 50 or of an AIS in detector 51 signifies that there is a fault upstream of junction 53, i.e. outside the link between the two end stations A and B. According to the invention, since the switching criteria are based on the detection of an AIS, there is no reason in this case to retransmit an AIS along the link line considered as being relieved (i.e. along a spare line) to the other remote end station. Indeed, this AIS would wrongly trigger off a switching operation. However, the remote end station must know whether an AIS has been received by the end station in question and that the AIS has been inhibited in order to reconstitute an AIS and retransmit it outwards of said remote station.

With this in mind, the alarm indicating and switching inhibiting circuit 5 comprises a Switching Inhibition Signal (SIS) generator 54. In response to a transmission fault or an AIS being detected by detectors 50 or 51, binary one signals are derived from outputs 500 and 510 thereof and coupled to an input of SIS generator 54 via OR gate 55, causing generator 54 to derive an SIS. This SIS is inserted in all the time-division multiplexed channels of the working line. Typically, the equivalent binary content of a switching inhibition signal (SIS) is composed of an alternate stream of "1" and "0" bits, such as 1010101 ... On a more general basis, a switching inhibition signal SIS is composed of an alternate stream of "1" bits and a predetermined integral number K(0) of "0" bits. For K=2, SIS is given by 1001001001 ... and for K=3 SIS is given by 1000100010001 ... This stream of bits is delivered on a continual basis via enabled AND gate 560 and OR gate 561 to a switching circuit 56, thence to outer side receive input 20 of the switching unit emitting end 2 which is assigned to the working line in question. Whilst the output of OR gate 55 is in state "1", the alternate stream of bits making up the SIS is continuous and is broken once the indicated outer fault has been removed. In the embodiment illustrated in FIG. 2, the circuit 5 also comprises the delay circuit 52, having an output connected via an AND gate 562 and an OR gate 561 of the switching circuit 56 to the corresponding receive input 20 of the emitting end 2. Delay circuit 52 introduces a delay at least equal to the time required for deriving an SIS. When functioning normally, the output state of the OR gate 55 is "0", and AND gate 562 is enabled via an inverter 563, whilst AND gate 560 is disabled. As soon as generator 54 emits an SIS, gate 562 is disabled, thereby inhibiting any AIS transmission to corresponding relieved or otherwise working line $1_1$ to $1_N$.

Referring now to FIG. 3, an alarm generating and detecting circuit 6 comprises a transmission fault detector 60, an alarm indication signal detector 61 and a switching inhibition signal detector 62, all driven in parallel by a signal at input 63, in turn responsive to the signal delivered from the end terminal $10_1$ to $10_N$ corresponding to the working line $1_1$ to $1_N$ in question.

By analogy to fault detector 50, fault detector 60 is not essential when the end terminal 10 is in the immediate vicinity of the end state in question. However when, for example, in relation to working lines $1_1$ to $1_4$, the multiplexer-demultiplexer 11 and terminal 12 acting as a common end terminal are in the intermediate vicinity of the end station A, B and the terminals $10_1$ to $10_4$ have been eliminated fault detector 60 enables any error or improper functioning concerning the demultiplexing operation in the multiplexer-demultiplexer 11 to be detected.

The detector 61 detects each alarm indication signal AIS transmitted by an end or intermediary terminal on the working line in question, in the direction from station B to station A for station A or from station A to station B for station B. This AIS corresponds to a transmission abnormality in the working line since, as already pointed out by reference to FIG. 2, the outer AIS's upstream of the link line along the considered transmission direction are inhibited in the alarm indicating and switching inhibition circuit 5. By analogy with the effect of emitting a switch-over triggering signal in end terminal 10 to monitor 4 as per the prior art, the setting of one of outputs 600, 610 of detectors 60, 61 to state "1" signals, via an OR gate 64, switching monitor 4 that one of the working lines $1_1$ to $1_N$ has failed and must be relieved by a selected free spare line. However, this relief operation in accordance with the invention comes after detection of a transmission fault at any point in the working line, including between any two intermediary terminals, such as 12, $13_N$ (FIG. 1).

As already stated, the coupling of an AIS to outer side input junction 53 of the corresponding circuit 5 in the remote end station (FIG. 2) must permit the transmission continuity of this AIS beyond the link on the working line, via receiving end 3 of the end station in question. Referring to FIG. 1, for a given working line, the detection of received AIS, for instance from the right of station B, causes an AIS to be transmitted to the left of station A. This AIS is inhibited in the link between the two end stations A and B by the transmission of an SIS from the right towards the left on the working line or a switched spare line, should the working line have failed.

The prime function of the detector 62 is to control the regeneration of this outer received AIS by the other remote end station. To preclude any mistaken AIS outward generator, SIS detector 62 validates a SIS only after having detected a determined number of SIS sequences during a predetermined duration, typically longer than a time interval assigned to a channel of the multiplex working line.

In response to detector 62 detecting a switching inhibition signal SIS, output 620 thereof changes to state "1" in order to control a switching circuit 65 and an alarm indication signal generator 66. An AIS is delivered from generator 66 to the receive input 30 of switching unit receiving end 3 corresponding to the working line via enabled AND gate 650 and an OR gate 651. SIS detector output 62 simultaneously enables AND gate 650 and, via inverter 653, disables AND gate 652.

The digital input of the AND gate 652 is connected to input junction 63 via a delay circuit 67. The circuit 67 introduces a delay which is at least equal to the time required to control the AIS emission by the generator 66 when a SIS is detected by the detector 62. Disabling of the gate 652 prevents the detected alarm inhibition signal from being substituted for an AIS. In the absence of any AIS, the output 620 of the SIS detector 62 is in state "0", the AND gate 650 is disabled and the AND gate 652 is enabled, thereby coupling the data signal from input junction 63 to receiving end 3 of the switching unit, via the components 67, 652 and 651.

Furthermore, if there is an AIS at input junction 63 of the alarm generating and detecting circuit 6, then during the delay introduced by delay circuit 67, there can be an exchange of order signals between the switching units of the two end stations A and B and the switching-over from the faulty working line to a free spare line in the switching units. Consequently, in the case of a possible switch-over, no AIS other than a fault peculiar to the line is transmitted outwards. On the other hand, should no spare line be free for carrying out the switch-over, then the AIS passes via the receiving end 3 and is transmitted to the remote switching exchange.

In accordance with another embodiment of the invention, the delay circuits 52 and 67 in circuits 5 (FIG. 2) and 6 (FIG. 3) are eliminated. This is depicted by the dashed lines in FIGS. 2 and 3. The input junction 53 of the alarm indicating and switching inhibiting circuit 6 is connected directly to the digital input of the AND gate 562. The input junction 63 of the alarm generating and detecting circuit 6 is connected directly to the digital input of the AND gate 652. According to this embodiment, the start of an AIS received from outside the link at the input junction 53 passes through the switching circuit 56 during a time long enough for detector 51 to detect an AIS and for generator 54 to generate an SIS. Typically, this period of time has a maximum during of around 125 $\mu$sec, corresponding to the transmission time of approximately 250 binary one bits at the start of the AIS for a 2048 kbits/s digital line.

In addition, one of the multiplexed channels may transmit an erroneous AIS or 8-bit byte having all binary one bits. To avoid any untimely replacement of an AIS by an SIS, detector 51 controls the SIS generator 54 only after having at least detected an AIS with a duration greater than the predetermined duration of a channel time interval. The same is so for the SIS detector 61, in relation to the switching control.

In the alarm generating and detecting circuit 6, a comparing circuit 68 with a predetermined integral number is interconnected to the input junction 63. Circuit 68 derives a binary output indicative of a comparison between the signal at terminal 63 and the predetermined integral; the binary output is coupled, via an AND gate 69 to the input of alarm indication signal detector 61. The digital input of the AND gate 69 is connected to the input junction 63. Comparing circuit 68 primarily comprises a counter for "1" bits which continually succeed each other. The counter is reset to zero (RZ) via an OR gate 621 by the AIS detector 62 as soon as its output 620 goes from states "0" to "1" thereby corresponding to the detection of an SIS. The other input of the OR gate 621 is connected to the output 610 of the AIS detector 61. If an integral number of bits in state "1" at the most equal to 250 is detected, then the output of the comparing circuit 68 remains in state "0" to disable AND gate 69, in which case no relief switching is controlled by the AIS detector 61. This is the case if 250 or fewer bits are followed by the emission of an SIS from the SIS generator 54. In the opposite case, i.e. when there is no SIS signal, the following sequence of "1" then necessarily emanates from an AIS which is delivered by an end or intermediate line terminal. The counter of the comparing circuit 68 controls enabling of the AND gate 69; it follows from this that a switch-over is possible for relieving the line, as soon as the count reaches the first predetermined integer number equal to 250. The counter is automatically and cyclically reset for a count which is equal to a second predetermined integer number of 500, and is reset to zero via the OR gate 621 once output 610 of detector 61 goes from "1" to "0". Generally detector 61 comprises a "1" bit counter having a low capacity of around ten. Thus, the inclusion of the comparison-to-500 circuit makes it possible to avoid any untimely relief switching should the start of an AIS signal not be substituted immediately, e.g., within a period of time equal at the most to $2 \times 125$ $\mu$sec for an SIS in corresponding circuit 5, or should a link line terminal have wrongly emitted at the most 500 bits of an AIS in response, for example, to a momentary loss of clock.

Lastly, as shown in FIG. 1, an alarm generating and detecting circuit $6_S$ is also connected between the end terminal $10_S$ of a spare line $1_S$ and the link side receive input $30_S$ of switching unit receiving end 3 of an end station A, B.

Generally speaking, the circuit $6_S$ is identical to that previously described in reference to FIG. 3, to provide relief of a link by a number of spare lines greater than one. Indeed, the detection of a failure on a spare line which relieves a faulty working line makes it possible to control, via the fault detector 60 using monitor 4, the switch-over of a failed spare line with another free spare line. In a certain organization embodiment of the stations, each end station comprises a plurality of switching units and the preceding spare line replacing the faulty spare line can be a free spare line of another switching unit.

Furthermore, an alarm generating and detecting circuit $6_S$ which is assigned to a spare line and comprises an SIS detector 62 and an AIS generator 66, is required for the outgoing restoration of an AIS following the detection of an outside AIS in the other remote end station and the emission of an SIS by the corresponding circuit 5 via that spare line relieving the working line.

However, if the number of spare lines equals to one, i.e. the case where the spare line may not be relieved by another spare line, the AIS resulting from a failure in this spare line would have to be transmitted outside the link. In the latter embodiment, circuit $6_S$ is not provided components 61 and 64 or 61, 64, 68, 69 and 621 of circuit $6_S$ are not provided and the fault detector 60 is connected to the AIS generator 66 and the switching monitor 4.

If the circuit $6_S$ is not provided, alarm indication and switching inhibiting circuits $5_1$ to $5_N$ are respectively interconnected between link side emit outputs 21 of switching unit emitting end 2 and the inputs of end terminals $10_1$ to $10_N$ such that the switching inhibition signals only pass via working lines $1_1$ to $1_N$. Should a working line be relieved, the spare line can convey an incoming AIS, as per prior art. In this case the switching monitor 4 frees the spare line in response to the detection of the AIS by the relief equipment associated to the spare line, thereby allowing working lines having ends on the outer side to be relieved.

What we claim is:

1. An end station for triggering relief of a working line in a bidirectional digital transmission link of a digital transmission system, the link having a plurality of bidirectional digital transmission working lines and a plurality of bidirectional digital transmission spare lines, the link being interconnected between two of the end stations, said end station comprising:

first detecting means for detecting a first digital alarm indication signal derived from outside of said link, first replacing means controlled by said first detecting means for replacing a first detected outside alarm indication signal by a first digital switching inhibition signal, said end station normally transmitting the first digital switching inhibition signal through said working line and transmitting the first digital switching inhibition signal on a spare line when said working line has failed and been relieved, second detecting means for detecting a second digital alarm indication signal derived from another end station or any intermediary station on said working line, said second means triggering switch-over from said working line to a spare line in said end station, third detecting means for detecting a second digital switching inhibition signal delivered from said first replacing means of another the end station on said working line, and second replacing means controlled by said third detecting means for replacing said second switching inhibition signal by a second alarm indication signal, as derived from outside of said link and coupled to the end station via the link.

2. The station of claim 1 wherein said end terminals of said working lines do not have auxiliary connections to said end station.

3. The station of claim 1 comprising fourth detecting means for detecting transmission faults on the section of said working line outside said link, said first replacing means being controlled by said fourth detecting means in response to the detection of a transmission fault on said outside working line section.

4. The station of claim 3 comprising fifth detecting means for detecting transmission faults on the section inside said working line between the end terminal neighbouring with said end station and said end station, said fifth detecting means triggering said switch-over from said working line to a spare line in response to the detection of a transmission fault on said inside section.

5. The station of claim 1 wherein said first detecting means controls said first replacing means in response to the detection of a first alarm indicating signal having a duration greater than the time interval assigned to a digital channel time-division multiplexed into said working line.

6. The station of claim 1 or 5 wherein said second detecting means controls said second replacing means in response to the detection of a second alarm indication signal having a duration greater than the time interval assigned to a digital channel time-division multiplexed into said working line.

7. The station of claim 1 comprising:

first delay means for delaying the data signal coming from the outside of said link by a first duration at least equal to that required by said first detection means to detect said first alarm indication signal and by said first replacing means to trigger the transmission of said first switching inhibition signal, and second delay means for delaying the data signal coming from said working line by a second duration at least equal to that required by said third detecting means to detect a second switching inhibition signal and by said second replacing means to trigger the transmission of said alarm indication signal.

8. The station of claim 7 wherein said second duration is at least equal to that required for exchanging switch over order signals between said two end stations and for switching said working line with a spare line.

9. The station of claim 1 wherein each alarm indication signal includes a continuous stream of bits having a predetermined binary state, and further comprising:

means receiving the digital data signal delivered by said working line and controlling said second detection means for counting the number of bits in a continuous stream of bits in the predetermined binary state delivered by said working line, and means for comparing the count of said counting means with a predetermined integer number greater than the number of bits in the predetermined binary state corresponding to a first maximum duration required by said first detecting means to detect a first alarm indication signal and by said first replacing means to trigger the transmission of said first switching inhibition signal, said comparing means triggering said second detecting means to detect a second alarm indication signal in response to said count being more than said predetermined number, and said counting means being set to zero by said third detecting means in response to detection of a second alarm inhibition signal.

10. The station of claim 1 wherein the equivalent binary content of a switching inhibition signal is composed of an alternate stream of bits in a first binary state and a predetermined number K(0) of bits in a second binary state such as 1 K(0), 1 K(0), 1 K(0) . . .

11. The station of claim 1 wherein each of said end stations for each of said spare lines comprises fourth detecting means for detecting a second switching inhibition signal delivered from the first replacing means of the other station assigned to a working line relieved by said spare line, and means controlled by said fourth detecting means for replacing said second switching inhibition signal, as detected by said fourth detection means, by a second alarm indication signal transmitted outside said link on said relieved working line.

12. In combination, a digital transmission link including a bidirectional digital transmission link having a plurality of bidirectional digital transmission working lines and a plurality of bidirectional digital transmission spare lines, the link being connected between two end stations, each of the end stations triggering relief of one of the working lines and including:

first detecting means for detecting a first digital alarm indication signal derived from outside of said link, first replacing means controlled by said first detecting means for replacing a first detected outside alarm indication signal by a first digital switching inhibition signal, said end station normally transmitting the first digital switching inhibition signal through said working line and transmitting the first digital switching inhibition signal on a spare line when said working line has failed and been relieved, second detecting means for detecting a second digital alarm indication signal derived from another end station or any intermediary station on said working line, said second means triggering switch-over from said working line to a spare line in said end station, third detecting means for detecting a second digital switching inhibition signal delivered from said first replacing means of another end station on said working line, and second replacing means controlled by said third detecting means for replacing said second switching inhibition signal by a second alarm indication signal, as derived from outside of said link and coupled to the end station via the link.

* * * * *